3,717,471
PREPARATION OF A LOW CARBOHYDRATE BEER
Michael R. Sfat and Bruce J. Morton, Manitowoc, Wis., assignors to Bio-Technical Resources, Inc., Manitowoc, Wis.
No Drawing. Continuation of abandoned application Ser. No. 873,089, Oct. 31, 1969. This application Feb. 1, 1972, Ser. No. 222,685
Int. Cl. C12c 11/04
U.S. Cl. 99—31                                13 Claims

ABSTRACT OF THE DISCLOSURE

A low carbohydrate alcoholic beer is produced by subjecting barley malt to aqueous extraction under conditions favorable to the extraction of protein while unfavorable to the extraction of carbohydrate, adding a highly fermentable sugar to the resulting extract to produce a brewers wort low in unfermentable carbohydrates, and fermenting the resulting wort.

RELATED APPLICATION

This is a continuation of application Ser. No. 873,089, filed Oct. 31, 1969 and now abandoned.

BACKGROUND OF THE INVENTION

This invention relates to a new brewing process, and more particularly, to a process for producing a low carbohydrate alcoholic beer.

U.S. Pat. No. 3,379,534 disclosed a process for producing a low carbohydrate beer in which the amylolytic enzyme amyloglucosidase is employed for the conversion to fermentable substances of unfermentable dextrins which are extracted in mashing, whereby the fermentation of the carbohydrates in the wort is more complete and a low carbohydrate beer is produced. The process requires the addition of the enzyme amyloglucosidase not naturally present in the mashing materials, and appropriate controls are required. The presence of amyloglucosidase in the fermentation medium will result in a residue of the enzyme in the beer product, which can lead to flavor instability.

U.S. Pat. No. 2,783,147 discloses another process for producing a low carbohydrate beer, which employs prolonged mashing and repeated additions of diastase, for increasing the proportion of fermentable carbohydrates. The additions of diastase are followed by fermentation to produce a low carbohydrate beer. The process requires substantial additional effort on the part of the brewer, beyond normal brewing operations.

SUMMARY OF THE INVENTION

The present invention provides a very simple and efficient process for producing a low carbohydrate beer requiring no departures from standard brewing practices and no addition of any material which might impair beer flavor.

The invention provides an improvement in a process for brewing an alcoholic beer from an aqueous extract of barley malt, wherein barley malt is subjected to aqueous extraction under conditions favorable to the extraction of protein while unfavorable to the extraction of carbohydrate, and a highly fermentable sugar is added to the resulting malt extract to produce a brewers wort low in unfermentable carbohydrates for the production of a low carbohydrate beer.

A low carbohydrate beer as contemplated by the invention will have a carbohydrate to protein weight ratio below about 5½ to 1. Preferably, the ratio is maintained below about 4 to 1, and can be reduced to as low as about 3 to 1. In comparison, the carbohydrate to protein weight ratio in standard U.S. beers generally is about 11 to 1 at the present time.

The invention thus serves to reduce the unfermentable carbohydrate content of the wort and consequently the carbohydrate content of the beer by selective extraction of the protein of barley malt, supplying the desired flavor characteristics to the beer, while less of the malt carbohydrate and therefore less unfermentable carbohydrate is extracted, and the additional carbohydrate necessary for production of the desired alcohol content is supplied by adding a highly fermentable sugar to the resulting malt extract. A low carbohydrate beer is produced in a relatively simple modification of classical brewing methods.

DESCRIPTION OF THE PREFERRED EMBODIMENTS

Proceeding in accordance with the invention, the carbohydrate content of the beer is, in general, directly proportional to the carbohydrate content of the barley malt extract. Likewise, the carbohydrate to protein weight ratio in the beer is, in general, directly proportional to such ratio in the malt extract. The foregoing relationships generally hold true, although nearly all of the carbohydrate content of the beer may be unfermentable, whereas, e.g., about 40–50% of the carbohydrate content of the malt extract may be unfermentable. It has been discovered in the invention that the desired low carbohydrate beer, having the above-described carbohydrate to protein ratio below about 5½ to 1, may be attained by extracting barley malt so as to produce an extract containing at least about 15% of protein, by weight of the solids content thereof. It is preferred for attaining a carbohydrate to protein ratio below about 4 to 1, that an extract containing at least about 20% of protein be produced.

The protein content of the malt extract depends upon the soluble protein content of the malt and the extraction temperature, as primary factors, and upon the extraction time and pH as secondary factors. A malt having a soluble protein content of at least about 6% by weight is preferred, and it is further preferred that the soluble protein content be at least about 7% by weight, with a content of 8% or greater being highly desirable.

A malt having the desired soluble protein content may be produced from barley grain having a protein content of at least about 11% by weight, and preferably at least about 13% by weight, with a content of 14% or greater being highly desirable. For this purpose, barley grain of the A, B, C and D-overs grades may be employed. The small-berried grains contain higher proportionss of protein, and consequently, the C and D-overs grades are preferred. An accompanying advantage is that such grades are also more economical.

Barley malt having the desired soluble protein content may be produced from grain of the foregoing protein content by the method for making distillers malt described in U.S. Pat. No. 3,116,221 to Sfat et al. In such method, malting is conducted in the presence of gibberellic acid. The malt is kilned at a preferred finishing temperature of about 77–85° C. (170–185° F.) in a standard brewers kiln cycle, for development of organoleptic properties and, secondarily, for reduction in amylolytic enzyme content. In this connection, the final kiln temperature is distinct from the temperature ordinarily employed for kilning distillers malt, which is about 60° C. (140° F.).

Barley malt produced in the foregoing manner is ground for extraction according to conventional procedures. It is preferred to grind the malt slightly finer than the customary grind for standard brewers malt, e.g., so that about 80% of the grain is retained on a No. 14 U.S. Sieve Series screen, having a sieve opening of 1.41 mm.

The ground barley malt is subjected to aqueous extraction or mashing under conditions favorable to the extraction of protein while unfavorable to the extraction of carbohydrate. Thus, the malt is admixed with water and extracted under temperature, time and pH conditions which are selective for the extraction of protein rather than carbohydrate. Temperature is the condition of primary significance, whereas extraction time is correlated with the extraction temperature for optimum selective protein extraction. The pH is maintained at a favorable value for proteolytic enzyme activity by employing brewing water of suitable pH and mineral content in accordance with standard brewing practices.

The barley malt preferably is extracted at a temperature of about 30–50° C. (86–122° F.), and a temperature of 35–40° C. (95–104° F.) is further preferred. Under such temperature conditions, extraction is continued for about ½–2 hours. The pH preferably is maintained in the range of about 4.5 to 6.0.

The malt protein content and the extraction conditions preferably are selected within the above-described limits to produce an extract containing at least about 15%, more preferably 20% of protein by weight of the solids content of the extract. An extraction proportion of such magnitude ultimately provides a beer having the desired protein and alcohol content, and organoleptic properties, together with the desired low carbohydrate content resulting from the low proportion of unfermentable carbohydrate in the malt extract.

The malt extraction may take place in the presence of added proteolytic enzyme, for increasing the protein recovery. The additional protein in the extract is accompanied by additional carbohydrate, and the protein proportion may decrease. However, the carbohydrate to protein ratio in the beer has not been found to suffer, and at times was improved or lowered.

In conventional brewing, a barley malt mash is first subjected to a "protein rest" in which the mash is held at a temperature of about 38° C. for about one hour, to extract protein. The malt mash and cooked adjunct then are mixed and heated to a conversion temperature commonly about 65–73° C. ,and the mash is held at such temperature for about ½–1 hour for extraction of carbohydrate and conversion of starch. In the process of the invention, the carbohydrate extraction step at the higher temperature is eliminated, and carbohydrate extraction is limited to such extraction as occurs at the lower temperature favorable to protein extraction and unfavorable to carbohydrate extraction. Consequently, the aqueous extract may contain the desired 15%, preferably 20% or more of protein in the solids content thereof, as compared to less than 7% of protein in the standard brewing process involving both extraction steps.

The extract obtained according to the invention contains from no starch to but trace amounts of starch, as determined by the starch-iodine test. It is preferable to eliminate any starch present in the extract, to avoid starch haze in the beer and also to minimize the unfermentable carbohydrate content of the wort. Depending upon the amount of starch present, the starch may be removed by subjecting the extract (separated from undissolved malt residue) to conversion or amylolysis employing one of several procedures. Thus, very small amounts of starch may be converted by raising the temperature of the extract to the above-described conventional conversion temperature of about 65–73° C., for about ½–1 hour, for conversion of the starch by the amylolytic enzymes naturally present in the extract. Alternatively, if the enzyme content of the extract is low or if greater amounts of starch are present, the enzyme content of the extract may be supplemented by the addition of alpha-amylase for conversion of starch and/or starch hydrolysis products under such temperature and time conditions.

A highly fermentable sugar is added to the extract, to provide the carbohydrate content required for alcohol production in the subsequent fermentation. The term "highly fermentable" refers to sugars capable of at least 90%, preferably at least 95% fermentation by brewers yeast and conversion to alcohol. Glucose (dextrose) is substantially completely fermentable and readily available, and therefore is the preferred sugar. It is contemplated that another mono- or disaccharide having the requisite fermentability, e.g., sucrose, along or in admixture with another sugar, might be employed.

In practice, the quantity of malt extract needed for producing a beer of a given protein content is determined. Beer protein may range from about 0.15 to 0.4% by weight, with about 0.25 to 0.3% generally preferred. To that quantity of extract is added fermentable sugar in a quantity sufficient, together with the fermentable portion of the extract carbohydrate, to yield the desired alcohol content in the beer. The alcoholic content of U.S. beer will fall in the range of about 2.8–4%, and may increase to 5% in malt liquor and ale. It is found that the weight ratio of the added fermentable sugar to the carbohydrate content of the malt extract is, in general, a minimum of about 2.7 to 1, for producing beer having the lower alcohol content, and the ratio increases correspondingly to the need for additional fermentable sugar to produce beer having higher alcohol contents.

After suitable dilution with brewing water, the wort is boiled with the addition of hops, strained, cooled, and again adjusted with brewing water, all in a conventional manner, to provide a wort ready for fermentation. Thus, for example, the extract with added sugar is diluted with brewing water, the wort is brought to a boil and boiled for about 1½ to 2 hours during which hops are added at the normal rate, the hops are strained out, the wort is cooled to about 20° C. and diluted with brewing water to the desired concentration, and the wort is finally cooled to about 8–14° C. The wort then is ready for fermentation with brewers yeast.

Diastatic enzymes may be added to the wort ready for fermentation, according to conventional brewery practice. Such enzymes function to increase the degree of fermentability of the system and the alcohol content of the beer. The carbohydrate content of the beer is correspondingly lowered. The value of enzyme addition depends upon the nature and amount of the carbohydrates present in the wort. The diastatic enzymes are destroyed by pasteurization and are not present in the finished beer.

The wort prepared according to the invention is fermented in a conventional manner: The wort is pitched with brewers yeast and fermented for about 5–14 days at a temperature of about 8–14° C. The beer product is finished in a conventional manner, as by transferring it to storage tanks for up to about two months, filtering, chillproofing, carbonating, bottling and pasteurizing.

Employing the preferred process of the invention, a beer product is produced having a carbohydrate caloric content, i.e., exclusive of alcohol and protein, of less than 1.6 calories per ounce, more preferably less than about 1.1 calories per ounce, as calculated on the basis of 1.19 calories per ounce for each one percent of real extract carbohydrate. Such caloric content is highly desirable to the ultimate consumer and, in general, may provide as much as one-third less total calories than regular beer having the same alcohol and protein content. Inasmuch as the new process employs no enzyme which will survive pasteurization, it is free of enzymes which can impair the flavor of the beer. The beer also has very good haze stability.

The invention is especially significant for fermentation by a bottom fermentation process, which is illustrated herein. The principles of the invention are also applicable to fermentation by top fermentation processes, wherein the wort may be employed to supply malt protein extract together with carbohydrate low in unfermentable materials.

The following examples illustrate various embodiments of the invention. It will be understood that the invention is not limited to the examples or to the materials, conditions, proportions and procedures set forth therein, which are merely illustrative. In the examples, all proportions are by weight.

EXAMPLE 1

Barley malt was prepared by the method for making distillers malt described in U.S. Pat. No. 3,116,221. One malt, identified as Run 1, was kilned at a finishing temperature of 77° C. (170° F.), and a second malt, identified as Run 2, was kilned at a finishing temperature of 85° C. (185° F.), in standard brewers kiln cycles. A blend of equal weight proportions of the two malts was made. The analyses of the kilned malts, Run 1, Run 2, and the 50/50 blend of Runs 1 and 2, are shown in Table 1.

TABLE 1

|  | Run 1 | Run 2 | Blend |
|---|---|---|---|
| Moisture, percent | 4.6 | 3.8 | 4.6 |
| Fine extract [1], percent | 75.2 | 72.8 | 75.4 |
| Fine-coarse difference, percent | 3.3 | 3.0 | 3.2 |
| Color, ° Lov | 2.09 | 4.72 | 4.04 |
| Diastatic power [1], ° L | 126 | 44 | 94 |
| Alpha amylase [1], D.U./g | 51.3 | 14.6 | 36.9 |
| Total protein [1], percent | 13.21 | 12.77 | 12.84 |
| Soluble protein [1], percent | 8.56 | 7.97 | 8.13 |
| Soluble/total protein ratio, percent | 64.8 | 62.4 | 63.3 |

[1] Dry basis.

The blended malt was employed for preparing a malt extract. The malt was milled so that about 80% of the grain was retained on a No. 14 U.S. Sieve Series screen. 1000 grams, dry basis, of the malt was mixed with 4 liters of brewing water and extracted for one hour at 38° C., with continuous stirring. The brewing water was hardened to include 240 p.p.m. calcium sulfate, 100 p.p.m. sodium chloride, and 55 p.p.m. magnesium sulfate.

The mash was filtered using a lauter tub, the grain bed was sparged with 2 l. of brewing water, and the sparge was collected with the initial filtrate, producing a total of 4,566 grams of malt extract. The extract contained 1.25% protein and 6.1% total solids, representing a protein content of 20.5% on a dry solids basis. The recovery of soluble protein from the malt was 70.2%.

A two-liter portion of the malt extract was mixed with 250 grams of glucose, and brewing water was added to make a wort volume of five liters. The wort was heated to 68° C. maintained at 68° C. for 30 minutes for starch conversion, and then heated to boiling. A total of 9 grams of hops was added during a boiling period of two hours, 2 grams at the start of boil, 2 grams after boiling for one hour, and 5 grams after boiling for 1 hour and 40 minutes. After boiling, the hops were strained, and the wort was cooled to approximately 20° C. The wort was adjusted with brewing water, pitched with brewers yeast at a rate approximating one pound per barrel, and fermented at a temperature of 12° C. for a period of seven days. After fermentation, the brew was allowed to stand overnight at a temperature of 0° C. to settle the yeast, filtered, carbonated and bottled. The properties of the boiled wort and of the beer were as shown in Table 2.

TABLE 2

| Wort: | |
|---|---|
| Color, after boil, ° Lov. | 4.2 |
| pH | 4.80 |
| Protein, percent | 0.52 |
| Extract, ° Plato | 8.45 |
| Beer: | |
| Real extract, percent | 1.68 |
| Alcohol, percent | 3.23 |
| R.D.F.[1], percent | 80.1 |
| pH | 3.82 |
| Protein, percent | 0.31 |
| Foam, sigma | 110 |
| Color, ° Lov. | 3.3 |
| Carbohydrate/protein ratio | 4.1/1 |
| Total calories [2]/12 oz. | 105 |
| Carbohydrate calories [3]/oz. | 1.53 |

[1] Real degree of fermentation.
[2] Calculated using the formula:

Calories/12 oz. = [(4×percent real extract) + (7×percent alcohol)]×specific gravity×3.548

[3] Calculated based on 1.19 calorie/oz./percent real extract carbohydrate.

EXAMPLE 2

The malt blend of Example 1 was employed for making beer on a large scale. The malt was milled so that approximately 80% was retained on a No. 10 U.S. Sieve Series screen, having a sieve opening of 2 mm.

A first quantity of 3400 lbs. of malt was mixed with 85 barrels of water and 5 lbs. of proteolytic enzyme mashing supplement (Mashase, Pfizer) and maintained at 38° C. with stirring for one hour. The mash then was run into a lauter tub and allowed to stand for fifteen minutes before commencing runoff. The runoff wort was recycled for ten minutes and then collected in a kettle heated to maintain the wort at about 65° C. for starch conversion. During runoff, there was added to the wort 2900 lbs. of glucose and one pound of diastatic enzyme (HT–1000, Miles Laboratories). The liquid level in the lauter tub dropped to the grain bed in about 30 minutes, and sparge brewing water at 38° C. was then added and collected until a total of about 140 barrels of wort was in the kettle. Additional brewing water was run directly to the kettle to make 165 barrels.

The wort was boiled for 1 hour and 30 minutes, during which 36 pounds of hops was added, 12 pounds being added after boiling 30 minutes and 24 pounds being added after 1 hour and 25 minutes. The wort was cooled to approximately 12° C. The wort had a cooler extract of 8.9° Plato and a protein content of 0.47%.

A second quantity of 3400 lbs. of malt was extracted in the same manner as the first quantity. Following extraction, the first 50 barrels of extract were collected. 2700 pounds of glucose and 0.75 pound of diastatic enzyme (HT–1000) were added to the extract portion, which was maintained at about 65° C. for starch conversion. Water was added to provide a total wort volume of about 160 barrels, and the wort was boiled and hopped as was the first wort. The cooler extract of the second wort was 7.4° Plato, and the protein content was 0.31.%.

The first and second worts were combined and had a total volume of 300 barrels. The combined wort had a protein content of 0.40%, and a cooler extract of 8.15° Plato. To the combined wort was added five pounds of diastatic enzyme (Brewers Fermex, Wallerstein Company), and the wort was pitched with brewers yeast at the rate of one pound per barrel. The wort was fermented for nine days at temperatures of 9–11° C., and then was allowed to stand in ruh for two days, after which a portion was filtered and bottled for analysis. The beer analysis is shown in Table 3.

TABLE 3

| | |
|---|---|
| Real extract, percent | 1.12 |
| Alcohol, percent | 3.49 |
| Color, ° Lov. | 2.7 |
| pH | 4.00 |
| Protein, percent | 0.21 |
| Reducing sugars, percent maltose | 0.39 |
| Dextrin, percent | 0.05 |
| R.D.F., percent | 85.2 |
| Foam, sigma | 81 |
| Ash, percent | 0.10 |
| Carbohydrate/protein ratio | 3.6/1 |
| Calories/12 oz. (calc.) | 102.6 |
| Carbohydrate calories/oz. (calc.) | 0.96 |

EXAMPLE 3

A distillers malt finished at a kiln temperature of 82° C. contained 7.07% soluble protein. A 488 gram quantity (dry basis) of the malt was extracted with 1340 grams of brewing water at 35° C., for 90 minutes. The mash was filtered and sparged with 500 ml. of distilled water, and the filtrate and sparge were combined. The extract thus obtained contained 22.0% protein on a dry solids basis. The iodine test for starch was negative, and the extract therefore was not subjected to a starch conversion step.

205 grams of glucose was added to the extract, and brewing water was added to make a total volume of four liters. The resulting wort was boiled for two hours during which 8 grams of hops was added. The wort was cooled to approximately 20° C., and had the properties shown in Table 4. The wort was pitched with yeast at a rate approximating one pound per barrel, and the wort was fermented at 12° C. for seven days. The beer was allowed to stand overnight at 0° C., and then filtered, carbonated and bottled. Analysis of the beer is shown in Table 4.

TABLE 4

Wort:
- Color, after boil, ° Lov. _____ 2.9
- pH _____ 5.55
- Protein, percent _____ 0.38
- Extract, ° Plato _____ 8.22

Beer:
- Real extract, percent _____ 1.43
- Alcohol, percent _____ 3.48
- R.D.F., percent _____ 82.5
- pH _____ 4.12
- Protein, percent _____ 0.22
- Foam, sigma _____ 111
- Color, ° Lov. _____ 1.8
- Reducing sugars, percent maltose _____ 0.50
- Dextrin, percent _____ 0.32
- Carbohydrate/protein ratio _____ 5.0/1
- Carbohydrate calories/oz. (calc.) _____ 1.32

EXAMPLE 4

Two 500 gram quantities (dry basis) of the malt of Example 3 were comparatively extracted, with and without proteolytic enzyme in the mash. Each quantity was extracted in two liters of brewing water for one hour at 38° C. Run 1 contained no additive, and Run 2 contained one gram of potassium metabisulfite and one gram of standardized papain.

Following extraction, the mashes were transferred to lauter tubs and allowed to stand for fifteen minutes for initial settling. Runoff was begun, and about two liters of each liquid was recycled, after which runoff was allowed to proceed. One liter of sparge water was added to each grain bed as the liquid level fell to the bed. The combined filtrate and sparge for each run was heated to 68° C. and maintained at that temperature 30 minutes for starch conversion. The analysis of the resulting extract is shown in Table 5, which indicated that the high level of papain increased the protein recovery and also increased the extraction of nonprotein solids, resulting in a reduction in the proportion of protein in the extract.

TABLE 5

| | Run 1 | Run 2 |
|---|---|---|
| Total extract collected, g | 2,309 | 2,375 |
| Solids, percent | 7.4 | 8.4 |
| Protein, percent | 1.28 | 1.36 |
| Protein, percent dry basis | 17.3 | 16.2 |
| Protein extracted, g | 29.6 | 32.4 |
| Solids extracted, g | 171 | 199 |
| Protein recovery, percent | 83.9 | 91.8 |

A 2000 gram quantity of each of the extracts was mixed with 225 grams of glucose and with brewing water to make five liters of wort. Each wort was boiled for two hours with the addition of 9 grams of hops, cooled and adusted to 8.8° Plato with brewing water. Each wort was pitched with yeast, fermented and finished as described in Example 3. The analyses of the worts and the beers are shown in Table 6.

TABLE 6

| | Run 1 | Run 2 |
|---|---|---|
| Wort: | | |
| Color, after boil, ° Lov | 2.9 | 2.1 |
| pH | 5.45 | 5.35 |
| Protein, percent | 0.45 | 0.53 |
| Beer: | | |
| Real extract, percent | 1.54 | 1.58 |
| Alcohol, percent | 3.35 | 3.33 |
| R.D.F., percent | 81.2 | 81.1 |
| pH | 3.82 | 3.80 |
| Protein, percent | 0.24 | 0.31 |
| Foam, sigma | 156 | 130 |
| Color, ° Lov | 2.1 | 1.6 |
| Reducing sugars, percent maltose | 0.55 | |
| Dextrins, percent | 0.50 | |
| Carbohyrate/protein ratio | 5.0/1 | 3.8/1 |
| Calories/12-oz (calc.) | 106 | 106 |
| Carbohydrate. calories/oz. (calc.) | 1.43 | 1.39 |

EXAMPLE 5

Distillers malt finished at a kiln temperature of 82° C. and having a soluble protein content of 7.07% was extracted with brewing water at 38° C. for one hour, to produce an extract containing 6.2% solids including 1.4% protein, the protein proportion being 22.9% of the solids. A 2000 ml. quantity of the extract was heated at 68° C. for thirty minutes to convert starch, blended with 250 grams of glucose, and brought to five liters with brewing water. The resulting wort was boiled and hopped in the manner of the preceding examples, after which it was cooled and adjusted with brewing water. The wort was pitched with yeast, fermented and finished in the manner of Example 3. The wort and beer analyses are shown in Table 7.

TABLE 7

Wort:
- Color, after boil, ° Lov. _____ 3.7
- pH _____ 5.10
- Protein, percent _____ 0.57
- Extract, ° Plato _____ 8.37

Beer:
- Real extract, percent _____ 1.62
- Alcohol, percent _____ 3.24
- R.D.F., percent _____ 80.7
- pH _____ 4.18
- Protein, percent _____ 0.38
- Foam, sigma _____ 102
- Color, ° Lov. _____ 2.9
- Carbohydrate/protein ratio _____ 3.0/1
- Calories/12-oz. (calc.) _____ 104
- Carbohydrate calories/oz. (calc.) _____ 1.36

EXAMPLE 6

A 1968 Larker A-Grade barley having a very high total protein content of 15.8% was malted in a brewers-type process, and kilned in a standard brewers malt kiln cycle, finishing at a temperature of 82° C. The kilned malt had a soluble protein content of 6.31% and other analyses as shown in Table 8.

A 384 gram quantity (dry basis) of the malt was extracted with two liters of brewing water for one hour at 38° C. and lautered. The resulting extract gave a negative starch test and therefore was not subjected to starch conversion. 300 grams of glucose was added to the extract, and water was added to make a total wort volume of five liters. The wort was boiled for two hours with normal addition of hops, cooled, adjusted with brewing water, pitched with yeast, fermented and finished as described in Example 3. The analysis of the malt, wort, and beer are shown in Table 8.

TABLE 8

Malt:
- Moisture, percent — 3.9
- Fine extract, percent — 75.2
- Fine-coarse diff., percent — 1.3
- Color, ° Lov. — 1.60
- Diastatic power, ° L. — 172
- Alpha amylase, D.U./g. — 45.0
- Total protein, percent — 15.72
- Soluble protein, percent — 6.31
- Soluble/total protein ratio, percent — 40.1

Wort:
- Color, after boil, ° Lov. — 1.6
- pH — 5.68
- Protein, percent — 0.36
- Extract, ° Plato — 8.33

Beer:
- Real extract, percent — 1.35
- Alcohol, percent — 3.39
- R.D.F., percent — 83.8
- pH — 3.82
- Protein, percent — 0.20
- Foam, sigma — 161
- Color, ° Lov. — 1.0
- Carbohydrate/protein ratio — 5.3/1
- Calories/12-oz. (calc.) — 104
- Carbohydrate calories/oz. (calc.) — 1.25

The invention thus provides a very simple and efficient process for brewing a low carbohydrate beer that is analytically and organoleptically comparable to conventional beers and free of enzyme activity, satisfying the requirements of both the brewer and the consumer.

While preferred embodiments of the invention have been described, it will be apparent that various changes and modifications may be made therein within the spirit and scope of the invention. It is intended that such changes and modifications be included within the scope of the appended claims.

We claim:

1. In a process for brewing an alcoholic beer from an aqueous extract of barley malt to produce a low carbohydrate beer, the improvement comprising
   subjecting barley malt having a soluble protein content of at least about 6% by weight to aqueous extraction at a temperature of about 30–50° C. and for a time period of about ½–2 hours to produce an extract containing at least about 15% of protein by weight of the solids content thereof,
   separating said extract from undissolved malt residue without heating beyond the end of said extraction time period, thereby preventing further extraction and conversion of malt carbohydrate in said residue,
   adding a highly fermentable sugar to said extract to produce a brewers wort fermentable in the absence of additional enzyme to a beer having a carbohydrate caloric content of less than about 1.6 calories per ounce and an alcohol content of about 2.8–5% by weight,
   boiling said wort, and
   fermenting said boiled wort with brewers yeast in an amyloglucosidase enzyme-free fermentation medium to produce a beer having said caloric content and said alcohol content.

2. A process as defined in claim 1 wherein said boiled wort is fermented in a fermentation medium containing added amyloglucosidase enzyme-free diastatic enzyme.

3. A process as defined in claim 1 wherein said separated malt extract is subjected to amylolysis when starch is present therein.

4. A process as defined in claim 1 wherein said sugar is glucose.

5. A process as defined in claim 1 wherein the boiled wort is fermented by a bottom fermentation process.

6. A process as defined in claim 3 wherein said sugar is glucose and the boiled wort is fermented by a bottom fermentation process.

7. In a process for brewing an alcoholic beer from an aqueous extract of barley malt to produce a low carbohydrate beer, the improvement comprising
   subjecting barley malt having a soluble protein content of at least about 6% by weight to aqueous extraction at a temperature of about 30–50° C. and for a time period of about ½–2 hours to produce an extract containing at least about 15% of protein by weight of the solids content thereof,
   separating said extract from undissolved malt residue without heating beyond the end of said extraction time period, thereby preventing further extraction and conversion of malt carbohydrate in said residue,
   adding a highly fermentable sugar to said extract to produce a brewers wort fermentable in the absence of additional enzyme to a beer having a carbohydrate caloric content of less than about 1.6 calories per ounce and an alcohol content of about 2.8–5% by weight,
   boiling said wort, and
   fermenting said boiled wort with brewers yeast in the absence of added diastatic enzyme to produce a beer having said caloric content and said alcohol content.

8. A process as defined in claim 7 wherein said separated malt extract is subjected to amylolysis when starch is present therein.

9. A process as defined in claim 8 wherein said sugar is glucose.

10. In a process for brewing an alcoholic beer from an aqueous extract of barley malt to produce a low carbohydrate beer, the improvement comprising
   subjecting barley malt having a soluble protein content of at least about 7% by weight to aqueous extraction at a temperature of about 30–50° C. and for a time period of about ½–2 hours to produce an extract containing at least about 20% of protein by weight of the solids content thereof,
   separating said extract from undissolved malt residue without heating beyond the end of said extraction time period, thereby preventing further extraction and conversion of malt carbohydrate in said residue,
   adding a highly fermentable sugar to said extract to produce a brewers wort fermentable in the absence of additional enzyme to a beer having a carbohydrate caloric content of less than about 1.6 calories per ounce and an alcohol content of about 2.8–5% by weight,
   boiling said wort, and
   fermenting said boiled wort with brewers yeast in the absence of added enzyme to produce a beer having said caloric content and said alcohol content.

11. A process as defined in claim 10 wherein said sugar is glucose.

12. A process as defined in claim 11 wherein said separated malt extract is subjected to amylolysis when starch is present therein.

13. In a process for brewing an alcoholic beer from an aqueous extract of barley malt to produce a low carbohydrate beer, the improvement comprising
   subjecting barley malt having a soluble protein content of at least about 6% by weight to aqueous extraction at a temperature of about 30–50° C. and for a time period of about ½–2 hours to produce an extract containing at least about 15% of protein by weight of the solids content thereof,
   separating said extract from undissolved malt residue without heating beyond the end of said extraction time period, thereby preventing further extraction and conversion of malt carbohydrate in said residue,
   adding a highly fermentable sugar to said extract in a minimum weight ratio of sugar to the carbohydrate content of said extract of about 2.7 to 1, to produce a brewers wort fermentable in the absence of additional enzyme to a beer having a carbohydrate caloric content of less than about 1.6 calories per ounce and an alcohol content of about 2.8–5% by weight, boiling said wort, and fermenting said boiled wort with brewers yeast in an amyloglucosidase enzyme-free fermentation medium to produce a beer having said caloric content and said alcohol content.

References Cited

UNITED STATES PATENTS

| | | | |
|---|---|---|---|
| 3,379,534 | 4/1968 | Gablinger | 99—31 |
| 2,223,444 | 12/1940 | Distler | 99—50 |
| 3,116,221 | 12/1963 | Sfat et al. | 99—53 X |
| 2,692,199 | 10/1954 | Weber | 99—52 X |
| 2,783,147 | 2/1957 | Pauls et al. | 99—38 |

OTHER REFERENCES

Hind, H. L.: Brewing Science and Practice, vol II, Chapman & Hall Ltd., London, 1950 (pp. 542–548, 605–620 and 651–653).

A. LOUIS MONACELL, Primary Examiner

D. M. NAFF, Assistant Examiner

U.S. Cl. X.R.

99—52